(12) United States Patent
Lan et al.

(10) Patent No.: US 9,968,849 B1
(45) Date of Patent: May 15, 2018

(54) SYSTEM AND METHOD FOR PROVIDING TARGETED RECOMMENDATIONS TO SEGMENTS OF USERS OF A VIRTUAL SPACE

(71) Applicant: KABAM, INC., San Francisco, CA (US)

(72) Inventors: Tian Lan, Alviso, CA (US); Bing Liu, Alviso, CA (US); Sainath Shenoy, Fremont, CA (US); Kenneth Yu, Menlo Park, CA (US); Liang Zhao, Fremont, CA (US)

(73) Assignee: Kabam, Inc., San Francisco, CA (US)

( * ) Notice: Subject to any disclaimer, the term of this patent is extended or adjusted under 35 U.S.C. 154(b) by 0 days. days.

(21) Appl. No.: 15/345,756

(22) Filed: Nov. 8, 2016

Related U.S. Application Data

(63) Continuation of application No. 14/658,111, filed on Mar. 13, 2015, now Pat. No. 9,486,709, which is a continuation of application No. 14/320,550, filed on Jun. 30, 2014, now Pat. No. 8,979,651, which is a continuation of application No. 13/633,782, filed on Oct. 2, 2012, now Pat. No. 8,764,561.

(51) Int. Cl.
*A63F 13/79* (2014.01)
*A63F 13/5375* (2014.01)
*A63F 13/25* (2014.01)

(52) U.S. Cl.
CPC .......... *A63F 13/5375* (2014.09); *A63F 13/25* (2014.09); *A63F 13/79* (2014.09)

(58) Field of Classification Search
CPC .... A63F 13/79; A63F 13/5375; A63F 13/795; A63F 13/12; A63F 2300/556
See application file for complete search history.

(56) References Cited

U.S. PATENT DOCUMENTS

| | | | |
|---|---|---|---|
| 8,764,561 B1 * | 7/2014 | Lan | A63F 13/12 463/31 |
| 8,979,651 B1 * | 3/2015 | Lan | A63F 13/12 463/31 |
| 9,132,349 B2 * | 9/2015 | Haze | A63F 13/5375 |
| 9,272,204 B2 * | 3/2016 | Gingher | G09B 19/18 |
| 9,307,051 B2 * | 4/2016 | Chung | H04L 67/36 |
| 9,486,709 B1 * | 11/2016 | Lan | A63F 13/12 |
| 2009/0276703 A1 * | 11/2009 | Jones | G06F 9/4446 715/705 |
| 2010/0249636 A1 * | 9/2010 | Pradeep | A61B 3/113 600/544 |
| 2012/0042282 A1 * | 2/2012 | Wong | G06F 17/30994 715/811 |
| 2012/0094757 A1 * | 4/2012 | Vago | H04L 67/42 463/31 |

* cited by examiner

*Primary Examiner* — David L Lewis
*Assistant Examiner* — Matthew D. Hoel
(74) *Attorney, Agent, or Firm* — Sheppard Mullin Richter & Hampton LLP

(57) ABSTRACT

Targeted recommendations may be provided to specific user segments. The users may be segmented on or more user parameters that facilitate targeted provision of recommendations to the individual segments of users. A recommendation may prompt a user to take a recommended action in the game.

23 Claims, 3 Drawing Sheets

SYSTEM AND METHOD FOR PROVIDING TARGETED RECOMMENDATIONS TO SEGMENTS OF USERS OF A VIRTUAL SPACE

CROSS REFERENCE RELATED APPLICATIONS

This application is a continuation of U.S. patent application Ser. No. 14/658,111, filed Mar. 13, 2015, is a continuation of U.S. patent application Ser. No. 14/320,550, filed Jun. 30, 2014, is a continuation of U.S. patent application Ser. No. 13/633,782, filed Oct. 2, 2012 (which issued as U.S. Pat. No. 8,764,561 on Jul. 1, 2014), which are incorporated by reference herein in their entireties.

FIELD

The disclosure relates to providing targeted recommendations to segments of users of a virtual space.

BACKGROUND

The provision of recommendations to users of a virtual space is known. Known systems implement various rudimentary features to facilitate providing recommendations to a user regarding his or her experience in a virtual space. Conventional systems leave users of virtual spaces in an unsatisfied or discouraged state when those users are faced with situations in the virtual space that may decrease their enjoyment of the virtual space.

SUMMARY

One aspect of the disclosure relates to providing recommendations to segments of users of a virtual space. The users may be segmented on or more user parameters that facilitate targeted provision of recommendations to the individual segments of users. A targeted recommendation may enhance a user's enjoyment of the virtual space and/or increase the chances of success for the user in the virtual space.

A system configured to provide providing recommendations to segments of users of a virtual space may include a server that operates in a client/server architecture with one or more client computing platforms used by the users to access the virtual space. The server may be configured to execute one or more of a space module, a parameter module, a segmentation module, a recommendation generation module, a recommendation transmission module, a recommendation tracking module, a recommendation analysis module, and/or other modules.

The space module may be configured to execute an instance of a virtual space. The space module may be configured to implement the instance of the virtual space to facilitate participation by users in a game within the virtual space by determining view information from the instance and transmitting the view information to the client computing platforms associated with the users. The view information may facilitate the presentation of views of the virtual space to the users by the client computing platforms.

The parameter module may be configured to obtain values of user parameters for the individual users. The user parameters may include one or more of a demographic parameter, a social parameter, a game parameter, an activity parameter, and/or other parameters. A demographic parameter may include one or more of age, sex, geographic location, language, income, education, career, marital status, and/or other demographic parameters. A social parameter may include one or more of a parameter derived from a social graph in a social network service, an in-game relationship, a platform from which the virtual space is accessed, and/or other social parameters. A game parameter may include one or more of an entity class, an entity faction, a usage amount, one or more usage times, a level, inventory in the virtual space, a score, and/or other game parameters. An activity parameter may include a parameter determined from an activity history of the user in the virtual space.

The segmentation module may be configured to form segments of the users on the values of one or more of the user parameters. For example, a first segment of users may be formed based on values of a first parameter. The first segment may include some portion of the overall users having values of the first parameter that correspond to each other. This may include values that are the same, values that are equal, values that fall within a specified range, values that are at least as adjacent as a threshold of some adjacency metric, and/or other values that correspond to each other.

The recommendation generation module may be configured to generate one or more sets of alternative recommendations for respective one or more segments of the users. For example, responsive to the one or more segments of users including a first segment, the recommendation generation module may generate at least a first set of alternative recommendations for the first segment that includes a first recommendation and a second recommendation. The first recommendation and the second recommendation may prompt a user to take a recommended action in the game in the virtual space. The recommendation generation module may be configured such that the first recommendation recommends a first action, and the second recommendation recommends a second action that is different from the first action.

The recommendation transmission module may be configured to transmit the recommendations to the appropriate users. The recommendation transmission module may transmit a recommendation to a user via one or more of in-game notification, a text message (e.g., SMS, etc.), an email, a chat message, and instant messenger message, a mobile device alert, and/or other communication media. The media for transmitting the recommendation may be dictated by the recommendation (e.g. as one of the variables), based on a user preference or setting, based on a determination as to whether the user is logged in to the virtual space and/or the game, and/or other information. The recommendation transmission module may be configured to transmit the recommendation responsive to triggering events.

The recommendation tracking module may be configured to track the response of users to the individual recommendations generated by the recommendation generation module. For example, responsive to transmission of the first recommendation to a first subset of users in the first segment and to transmission of the second recommendation to a second subset of users in the first segment, the recommendation tracking module may track the responses of the first subset of users to the first recommendation and may track the responses of the second subset of users to the second recommendation.

The recommendation analysis module may be configured to assess a relative effectiveness of recommendations transmitted to one or more segments of users. The effectiveness of the recommendations may be determined based on the responses of the one or more segments of users. For example, responsive to the tracking of the responses of the first subset of users to the first recommendation and to the tracking of the responses of the second subset of users to the second recommendation, the recommendation analysis module may determine whether the first recommendation or the second recommendation is more effective for the first segment of users.

For example, the recommendation analysis module may be configured to assess the relative effectiveness of a given recommendation as a function of a number of users that perform a recommended action included in the given recommendation. The recommendation analysis module may be configured to assess the relative effectiveness of a given recommendation as a function of retention of users that perform a recommended action included in the given recommendation versus users that do not perform the recommended action. Retention of users may be quantified, for example, as an average retention time of users that perform the recommended activity, as a number of users that are retained for a threshold amount of time, a number of users that spend a threshold amount of money in the game, an average revenue per user, and/or other quantifiers. Time may be time in the game or real-world time. The recommendation analysis module may also be configured to assess the relative effectiveness of a given recommendation as a function of an average amount of participation by users in the game within a given amount of time after transmission of the recommendation. In another example, the recommendation analysis module may also be configured to assess the relative effectiveness of a given recommendation as a function of an average amount of time from the transmission of the recommendation to participation by users in the game.

The recommendation generation module may be further configured to replace recommendations determined by the recommendation analysis module to be relatively ineffective for the individual segments. This may include, for example, responsive to a determination that the first recommendation is more effective for the first segment than the second recommendation for the first segment, generating a third recommendation to be provided as an alternative to the first recommendation for the first segment. Subsequent to determination of the third recommendation, the recommendation transmission module may transmit the third recommendation to the first segment of users as an alternative to the first recommendation. Transmission of the second recommendation to the first segment of users as an alternative to the first recommendation may cease.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
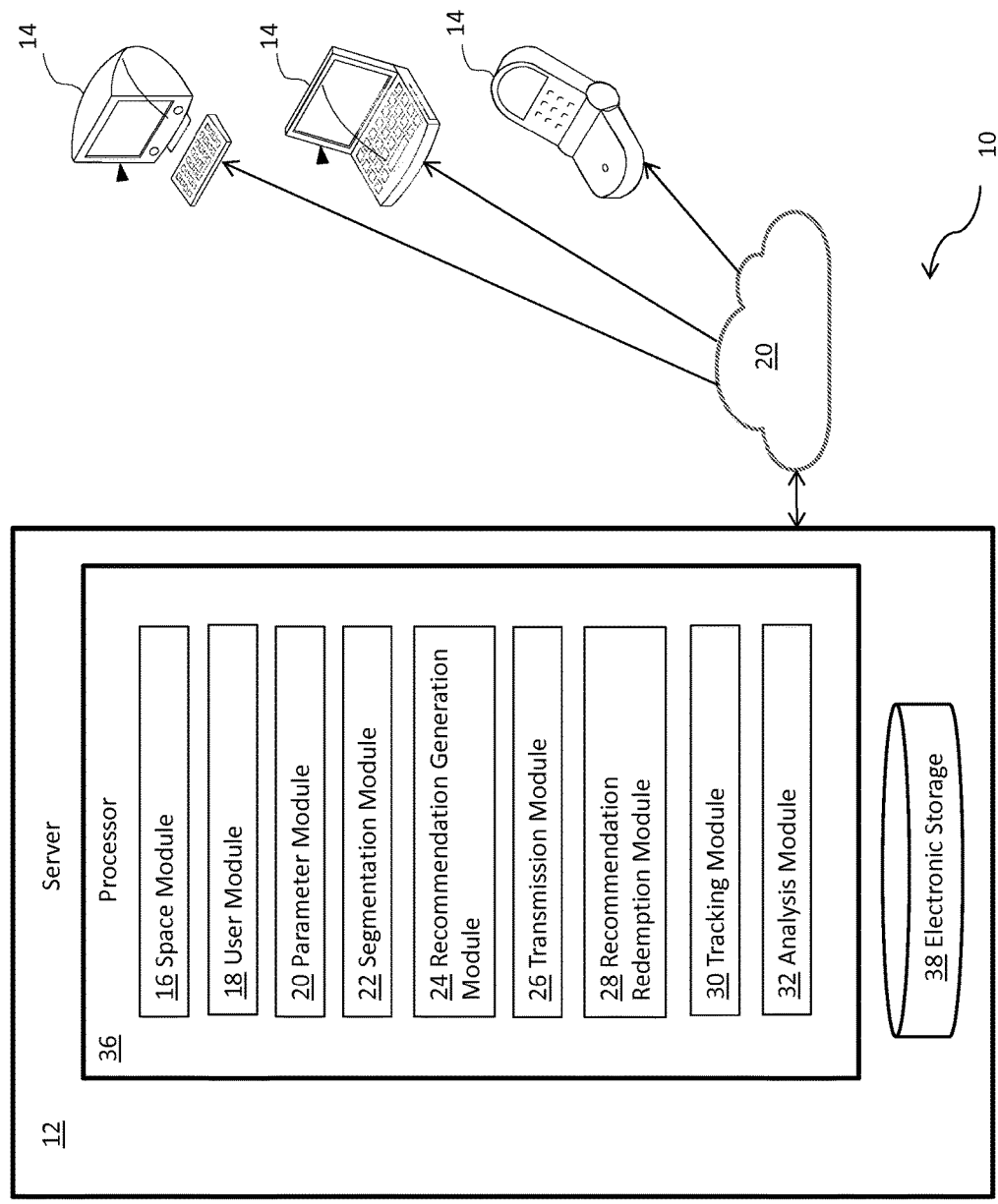
FIG. 1 illustrates a system configured to provide targeted recommendations to segments of users of a virtual space.

FIG. 1 illustrates a system 10 configured to provide targeted recommendations to segments of users in a virtual space. System 10 may be configured to provide the virtual space to the users over a network. Providing the virtual space may include hosting the virtual space over a network. System 10 may be configured to perform A/B testing on users in order to determine targeted recommendations for segments of users. A targeted recommendation may enhance a user's enjoyment of the virtual space and/or increase the chances of success for the user in the virtual space. The A/B testing may be performed on specific segments of the users, where such segments are determined on user parameters. The user parameters used to segment the users may include one or more of demographic parameters, social parameters, game parameters, activity parameters, and/or other parameters. In some implementations, system 10 may include a server 12. The server 12 may be configured to communicate with one or more client computing platforms 14 according to a client/server architecture. The users may access system 10 and/or the virtual space via client computing platforms 14.

Server 12 may be configured to execute one or more computer program modules. The computer program modules may include one or more of a space module 16, a user module 18, a parameter module 20, a segmentation module 22, a recommendation generation module 24, a transmission module 26, a recommendation redemption module 28, a tracking module 30, an analysis module 32, and/or other modules.

Space module 16 may be configured to implement the instance of the virtual space executed by the computer modules to determine view information defining views of the virtual space. The view information may then be communicated (e.g., via streaming, via object/position data, and/or other information) from server 12 to client computing platforms 14 for presentation to users. The view information determined and transmitted to a given client computing platform 14 may correspond to an entity being controlled by a user via the given client computing platform 14. The view information determined and transmitted to a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 16 is not intended to be limiting. Space module 16 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 16, users may control entities to interact with the virtual space and/or each other. The entities may include one or more of characters, objects, simulated physical phenomena (e.g., wind, rain, earthquakes, and/or other phenomena), and/or other elements within the virtual space. User-controlled characters may include avatars. As used herein, an entity may refer to an object (or group of objects) present in the virtual space that represents an individual user. The entity may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Control over the entities may be exercised by the users through control inputs and/or commands input through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through space module 16).

Within the virtual space, users may participate in a game. The game may include various tasks, levels, quests, and/or other challenges or activities for users to participate in. The game may include activities in which users (or their entities) are adversaries, and/or activities in which users (or their entities) are allies. The game may include activities in which users (or their entities) are adversaries of non-player characters, and/or activities in which users (or their entities) are allies of non-player characters. In the game, entities controlled by the user may obtain points, virtual currency or other virtual items, experience points, levels, and/or other demarcations indicating experience and/or success. Space module 16 may be configured to perform the functions associated with the game in executing the instance of the virtual space.

User module 18 may be configured to access and/or manage one or more user accounts associated with users of system 10. The user accounts may include user information. The one or more user accounts and/or user information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, activity information of users, browsing history of users, a client computing platform identification associated with a user, a phone number associated with a user, user settings, and/or other information related to users. The user information may include and/or indicate an activity level of the user. The activity level may include previous login time(s), previous logout time(s), login frequency, time spent logged in, and/or other activity information. The user information may also include information related to purchases in or for the virtual space. Such information may include, for example, activity information for individual transactions, a spend rate, a total spend amount, and/or other information related to user purchases.

As will be discussed further below, users may participate in the virtual space by controlling entities within the virtual space. The user information in the user accounts may include information related to the entities controlled by the users in the virtual space. Such information may include, for example, an entity type, an entity class, an entity identification, a level, inventory information, status information, and/or other information related to entities controlled by users in the virtual space.

Parameter module 20 may be configured to obtain values for one or more user parameters. The values may be stored to the user profiles managed by user module 18. The user parameters may include one or more of a demographic parameter, a social parameter, a game parameter, an activity parameter, and/or other parameters.

A demographic parameter may include a parameter related to the real world demographics of the users. For example, a demographic parameter may include one or more of age, gender, geographic location, language, income, education level, career, marital status, and/or other demographic parameters. Parameter module 20 may be configured to obtain values of demographic parameters based on registration information provided by the user to system 10 (e.g., upon opening an account to participate in the virtual space and/or the game), information received from an online platform from which the virtual space is accessed (e.g., via a social network website, a microblogging service, and/or other online platforms), information derived or deduced from one or more other user parameters (e.g., determined from a usage parameter, from a social parameter, and/or other parameter), and/or from other information or sources.

A social parameter may include a parameter related to a social network and/or the manner and/or individuals with which a user socializes in and/or out of the virtual space. By way of non-limiting example, a social parameter may include one or more of a parameter derived from a social graph in a social network service, an in-game relationship, a social platform from which the virtual space is accessed, and/or other social parameters. Parameter module 20 may be configured to obtain values of social parameters from relationships established within the virtual space (e.g., friendships, alliances, and/or other relationships), information received from an online platform from which the virtual space is accessed, information related to the usage of the virtual space (e.g., other users with whom a first user participates in the virtual space and/or the game, other users with whom a first user communicates in the virtual space, and/or other information related to usage), and/or from other information or sources.

A game parameter may include a parameter related to participation and/or usage of the user in the game and/or the virtual space. By way of non-limiting example, a game parameter may include one or more of an entity class, an entity faction, a usage amount, one or more usage times, a level, inventory in the virtual space, a score, and/or other parameters. Parameter module 20 may be configured to obtain values of the game parameters by monitoring user interaction with the virtual space. This may include monitoring interactions of users and/or the entities they control in the instance of the virtual space executed space module 16, and/or monitoring other interactions.

An activity parameter may be related to an activity history of the user in the virtual space. By way of non-limiting example, an activity history may include one or more of activity level of the user, virtual currency account information of the user, relationship information of the user, virtual space usage information of the user, interaction history of the user, browsing history of the user, purchase history and/or other activity history. An activity parameter may also include one or more of an average participation time in a session of the user, an average time in a session after the user experiences an event, an average time between sessions of the game, a value metric representing the value of the user, a spend velocity, and/or other activity parameters. An event may include, for example, joining an alliance, losing status, losing money, getting lost in the virtual game, losing a friendship, gaining a friendship, losing an alliance, receiving an offer for a virtual item, purchasing a virtual item, changing a user entity, changing a view of the game, engaging in activity with another user, entering a new level of the game, engaging in a training session, engaging in an in-game experience separate from the game, and/or other events. A purchase history may include information relating to, for example, user purchases, user sales, user exchanges, user browsing for potential virtual items for purchase, and/or other purchase events. A purchase may include a transaction in which real world currency is exchanged for one or more virtual items, a transaction in which one or more virtual items (e.g., virtual currency) is exchanged for another one or more virtual items, and/or other transactions in which one or more virtual items are received or given by a user.

Segmentation module 22 may be configured to form segments of the users on one or more of the parameters for which values are obtained by parameter module 20. For example, a first segment of users may be formed based on values of a first parameter. The first segment may include some portion of the overall users having values of the first parameter that correspond to each other. This may include values that are the same, values that are equal, values that fall within a specified range, values that are at least as adjacent as a threshold of some adjacency metric, and/or other values that correspond to each other. The use of an exemplary segment formed based on a single parameter is not intended to be limiting. The scope of this disclosure extends to implementations in which the first segment is formed on the first parameter, and on one or more other parameters.

In some implementations, segmentation module 22 may be configured to identify segments of users that have similar tendencies. For example, a segment of users may have similar activity tendencies, similar usage tendencies, similar responses to recommendations, and/or other tendencies in common. Segmentation module 22 may identify segments of users having similar tendencies through analysis of the parameters obtained by parameter module 20, and/or from other sources.

In some implementations, segmentation module 22 may be configured to receive administrator selection of one or more values for one or more parameters. Segmentation module 22 may be configured to define a graphical user interface that is provided to an administrator user to receive entry and/or selection of such values.

Figure 2:
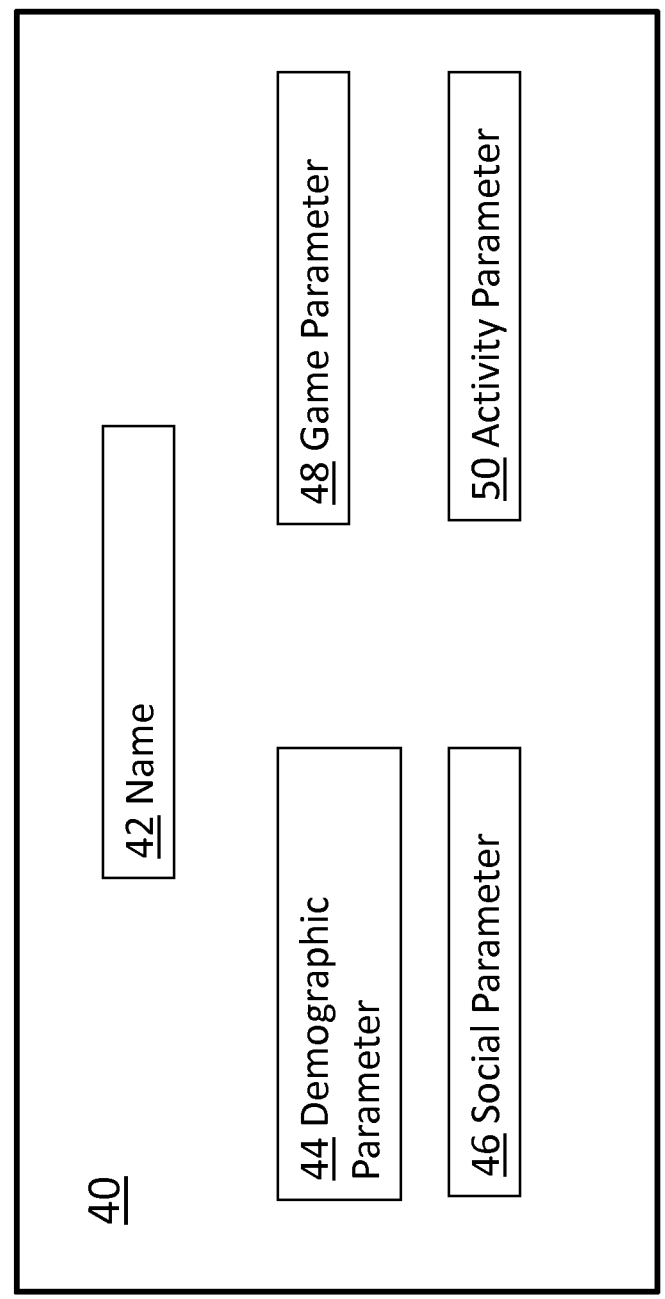
FIG. 2 illustrates a view of a graphical user interface configured to receive entry and/or selection of a definition of a user segment.

By way of illustration, FIG. 2 depicts a view 40 of a graphical user interface configured to receive entry and/or selection of a definition of a segment of users of the virtual space. View 40 may include one or more of a name field 42, a demographic parameter field 44, a social parameter field 46, a game parameter field 48, an activity parameter field 50, and/or other fields. Name field 42 may be configured to receive entry and/or selection of a name for a user segment being defined by the administrator. Demographic parameter field 44 may be configured to receive entry and/or selection of one or more demographic parameters that should be used to form the user segment. Through demographic parameter field 44, the administrator may enter and/or select parameter value(s) for the entered and/or selected one or more demographic parameters. The entered and/or selected parameter value(s) may be implemented to determine whether the individual users should be included in the user segment. The entered and/or selected parameter value(s) may specify a value that users should have to included and/or excluded from the segment, a range to determine whether users should be included and/or excluded, and/or may specify inclusion or exclusion in other ways. Social parameter field 46 may be configured to receive entry and/or selection of one or more social parameters that should be used to form the user segment. Through social parameter field 46, the administrator may enter and/or select parameter value(s) for the entered and/or selected one or more social parameters. Game parameter field 48 may be configured to receive entry and/or selection of one or more game parameters that should be used to form the user segment. Through game parameter field 48, the administrator may enter and/or select parameter value(s) for the entered and/or selected one or more game parameters. Activity parameter field 50 may be configured to receive entry and/or selection of one or more activity parameters that should be used to form the user segment. Through activity parameter field 50, the administrator may enter and/or select parameter value(s) for the entered and/or selected one or more activity parameters.

Returning to FIG. 1, recommendation generation module 24 may be configured to generate one or more sets of alternative recommendations for respective one or more segments of the users. This may include a set of recommendations for the first user segment that includes at least a first recommendation and a second recommendation. A recommendation may prompt a user to take one or more recommended actions in the game. The recommendation generation module 24 may be configured such that the first recommendation recommends a first action, and the second recommendation recommends a second action that is different from the first action. The recommendation generation module 24 may be configured such that the first recommendation recommends a first set of actions, and the second recommendation recommends a second set of actions that is different from the first set of actions. The recommendation generation module 24 may also be configured to generate one or more recommendations for an individual user based on user parameters. The individual user parameters may be user parameters accessed by segmentation module 22, user parameters associated with the individual user, and/or other individual user parameters.

The recommendations within a set of recommendations may differ by one or more variables. The variables of a recommendation may include one or more of the action(s) recommended, the types of actions recommended, the format in which the recommendation is arranged, the method of transmission, one or more incentives related to the one or more recommended actions, and/or other variables. A type of action may include action related to a user entity, to a user relationship, to a view, to a user's activity level, to a user's purchasing ability, to a virtual item, and/or other type of action. An incentive to undertake one or more of the recommended action(s) may include a discount on a price of a virtual item, an ability to undertake another recommended action, and/or other incentives. Non-limiting examples of recommended actions may include, among other things, an upgrade to be obtained for a virtual building, virtual object, virtual troop, or other virtual entities; a membership in a group to be sought (e.g., membership in an alliance, guild, or other group); a virtual building, virtual object, virtual troop, or other virtual entity to be obtained; a quest or other task to be undertaken; a battle or conflict to be engaged in; and/or other actions.

A recommended action may provide a functional advantage in the virtual space (e.g., an advantage in the game). A recommended action may be expressed aesthetically within views of the instance of the virtual space. A recommended action may have value in the virtual space that facilitates increasing a bargaining position of the user. For example, an ability to undertake the recommended action may be transferred by the user to another user for some other consideration within the virtual space (e.g., for an ability to undertake another action, for a relationship, for an alliance, for a virtual item, for a service, for an advantage, and/or other consideration). The transfer may involve, for example, a sale, a sharing, a gift, and/or other transfer. Consideration may also include, for example, virtual items, virtual currency, agreement to join in an alliance, establishment of a relationship, ceding of territory, agreeing to a treaty and/or peace terms in a battle, increased status in the game, increased power, sharing of resources, and/or other consideration.

Recommendation generation module 24 may be configured to vary the variables in between recommendations in the sets of recommendations to perform A/B testing on the segments of users. The determination of the values of the variables in the individual recommendations (e.g., one or more of the variables to be varied between the recommendations) may be performed manually (e.g., through a graphical user interface defined by recommendation generation module 24) by one or more administrators. The determination of the values of the variables in the individual recommendations (e.g., one or more of the variables to be varied between the recommendation) may be made automatically. Any technique for determining differences between recommendations as part of A/B testing may be implemented without departing from the scope of this disclosure. Recommendation generation module 24 may also be configured to vary the variables in between recommendations in the sets of recommendations to an individual user based on user parameters for the individual user, user information for the individual user, and/or other user data.

Transmission module 26 may be configured to transmit the recommendations to the users. Transmission module 26 may transmit a recommendation to a user via one or more of in-game notification, a text message (e.g., via SMS and/or other text message types), an email, a chat message, and instant messenger message, a mobile device alert, and/or other communication media. The media for transmitting the recommendation may be dictated by the recommendation (e.g. as one of the variables), based on a user preference or setting, based on a determination as to whether the user is logged in to the virtual space and/or the game, and/or other information.

Transmission module 26 may be configured to transmit the recommendations responsive to corresponding triggering events. Such events may include, for example, a game event, a specified real world timing, a user participation in the game, a lack of user participation in the game, and/or other events. A trigger for a triggering event may include, for example, a decrease in an amount of time that the user has spent in a session, an amount of time the user has spent without logging into the game, a dropoff in a ratio of time playing the game in a single session versus time to return to the game in the virtual space, a decrease in participation while in the game, a decrease in participation with other users, an unexpected ending of a game session by a user, a selling of an unexpected amount user's virtual assets, a breaking and/or weakening of an alliance, a rejection of a request for a relationship (e.g., friendship, alliance, and/or other relationship in the game) and/or other triggers. The trigger may be spurred by statistically significant change or may rely on exceeding a threshold value. The threshold amount may be, for example, based on an average of all user activity, based on average activity of an individual user, set by an administrator, and/or otherwise determined.

Recommendation redemption module 28 may be configured to redeem recommendations transmitted by recommendation transmission module 26. This may include undertaking a recommended action, treating the recommendation like a virtual item, and/or other redemptions. For example, recommendation redemption module 28 may facilitate the sharing or transfer, by the user, of the recommendation. As mentioned above, a recommended action may have value in the virtual space that facilitates increasing a bargaining position of the user.

Tracking module 30 may be configured to track the responses of users to the individual recommendations generated by recommendation generation module 24. This may include determining a time spent viewing a recommendation, determining whether a user viewed a recommendation, determining whether a user redeemed a recommendation (e.g., undertaking the recommended action, transferring the recommendation, and/or other redemption activity), and/or other tracking activities. By way of example, responsive to transmission of the first recommendation to a first subset of users in the first segment, and to transmission of the second recommendation to a second subset of users in the first segment, tracking module 30 may track the responses of the first subset of users to the first recommendation and/or may track the responses of the second subset of users to the second recommendation.

Analysis module 32 may be configured to assess the relative effectiveness of recommendations transmitted to the segments of users based on the responses of the users. This may include determining, for individual sets of recommendations, a most effective recommendation in a set of recommendations, a least effective recommendation in a set of recommendations, a relative ranking of recommendations in a set of recommendations, and/or other determinations related to the relative effectiveness of the recommendations in an individual set of recommendations. Such determinations may be made based on the responses of the users as tracked by tracking module 30. The determination that the first recommendation is more effective than the second recommendation may be made responsive to some threshold number of transmissions of the first recommendation and/or the second recommendation (alone or combined) being made, a level of difference in effectiveness between the first recommendation and the second recommendation breaching a threshold, a level of effectiveness of the second recommendation falling below a threshold level, and/or other events.

Analysis module 32 may be configured to determine whether the first recommendation or the second recommendation is more effective for the first segment of users based on the responses of the users in the first segment to the first recommendation and the second recommendation. For example, analysis module 32 may be configured to assess the relative effectiveness of a given recommendation as a function of a number of users that perform a recommended action included in the given recommendation. Analysis module 34 may also be configured to assess the relative effectiveness of a given recommendation as a function of retention of users that perform a recommended action included in the given recommendation versus users that do not perform the recommended action. Retention of users may be quantified, for example, as an average retention time of users that perform the recommended activity, as a number of users that are retained for a threshold amount of time, a number of users that spend a threshold amount of money in the game, an average revenue per user, and/or other quantifiers. Analysis module 32 may also be configured to assess the relative effectiveness of a given recommendation as a function of an average amount of participation by users in the game within a given amount of time after transmission of the recommendation. In another example, analysis module 32 may also be configured to assess the relative effectiveness of a given recommendation as a function of an average amount of time from the transmission of the recommendation to participation by users in the game. Time may be time in the game or real world time.

Recommendation generation module 24 may be configured to replace recommendations determined by analysis module 32 to be relatively ineffective for the individual segments. For example, responsive to a determination that the first recommendation is more effective for the first segment than the second recommendation for the first segment, recommendation generation module 24 may replace the second recommendation with a third recommendation. This may include replacing the second recommendation with a third recommendation in the first set of recommendations, and/or providing the third recommendation as an alternative to the first recommendation for the first segment. The third recommendation may have been previously generated or defined, of may be generated and/or defined responsive to the determination that the first recommendation is more effective for the first segment than the second recommendation.

Server 12 and/or client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be operatively linked via some other communication media.

A given client computing platform 14 may include one or more processors configured to execute computer program modules. The computer program modules may be configured to enable an expert or user associated with the given client computing platform 14 to interface with server 12, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Server 12 may include electronic storage 38, one or more processors 36, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 38 may comprise electronic storage media that electronically stores information. The electronic storage media of electronic storage 38 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 38 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 38 may include one or more virtual storage resources (e.g., cloud storage, a virtual private network, and/or other virtual storage resources). Electronic storage 38 may store software algorithms, information determined by processor 36, information received from server 12, information received from client computing platforms 14, and/or other information that enables server 12 to function as described herein.

Processor(s) 36 is configured to provide information processing capabilities in server 12. As such, processor 36 may include one or more of a digital processor, an analog processor, a digital circuit designed to process information, an analog circuit designed to process information, a state machine, and/or other mechanisms for electronically processing information. Although processor 36 is shown in FIG. 1 as a single entity, this is for illustrative purposes only. In some implementations, processor 36 may include a plurality of processing units. These processing units may be physically located within the same device, or processor 36 may represent processing functionality of a plurality of devices operating in coordination. The processor 36 may be configured to execute modules 16, 18, 20, 22, 24, 26, 28, 30 and/or 32. Processor 36 may be configured to execute modules 16, 18, 20, 22, 24, 26, 28, 30 and/or 32 by software; hardware; firmware; some combination of software, hardware, and/or firmware; and/or other mechanisms for configuring processing capabilities on processor 36.

It should be appreciated that although modules 16, 18, 20, 22, 24, 26, 28, 30 and/or 32 are illustrated in FIG. 1 as being co-located within a single processing unit, in implementations in which processor 36 includes multiple processing units, one or more of modules 16, 18, 20, 22, 24, 26, 28, 30 and/or 32 may be located remotely from the other modules. The description of the functionality provided by the different modules 16, 18, 20, 22, 24, 26, 28, 30 and/or 32 described below is for illustrative purposes, and is not intended to be limiting, as any of modules 16, 18, 20, 22, 24, 26, 28, 30 and/or 32 may provide more or less functionality than is described. For example, one or more of modules 16, 18, 20, 22, 24, 26, 28, 30 and/or 32 may be eliminated, and some or all of its functionality may be provided by other ones of modules 16, 18, 20, 22, 24, 26, 28, 30 and/or 32. As another example, processor 36 may be configured to execute one or more additional modules that may perform some or all of the functionality attributed below to one of modules 16, 18, 20, 22, 24, 26, 28, 30 and/or 32.

Figure 3:
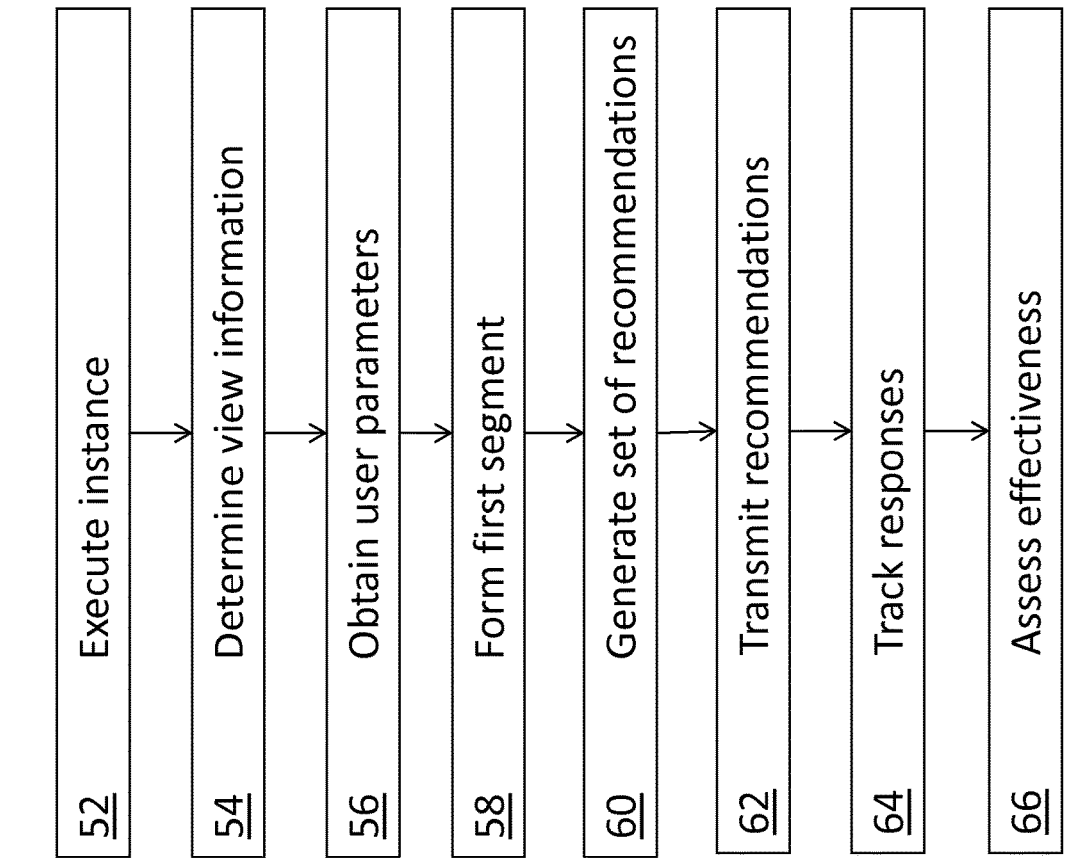
FIG. 3 illustrates a method of providing targeted recommendations to segments of users of a virtual space.

FIG. 3 illustrates a method 50 of hosting a virtual space to client computing devices for interaction by users. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 3 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a space module the same as or similar to space module 16 (shown in FIG. 1 and described above).

At an operation 54, the executed instance of the virtual space may be implemented to determine view information. The view information may define views to be presented to users via client computing platforms. In some implementations, operation 54 may be performed by a space module the same as or similar to space module 16 (shown in FIG. 1 and described above).

At an operation 56, values of user parameters for users of the virtual space may be obtained. In some implementations, operation 56 may be performed by a parameter module the same as or similar to parameter module 20 (shown in FIG. 1 and described above).

At an operation 58, a first segment of users may be formed on the values of one or more of the parameters as obtained at operation 56. The first segment of users may be formed on one or more values of the first parameter. In some implementations, operation 58 may be performed by a segmentation module the same as or similar to segmentation module 22 (shown in FIG. 1 and described above).

At an operation 60, a set of recommendations for the first segment of users may be determined. The set of recommendations may include a first recommendation and a second recommendation. The first recommendation may include a first action different from a second action included in the second recommendation. The first recommendation may different from the second recommendation by one or more variables. In some implementations, operation 60 may be performed by a recommendation generation module the same as or similar to recommendation generation module 24 (shown in FIG. 1 and described above).

At an operation 62, the recommendations in the one or more sets of recommendations may be transmitted to the users in the first segment. This may include transmitting the first recommendation to a first subset of the users in the first segment, and transmitting the second recommendation to a second subset of the users in the first segment. In some implementations, operation 62 may be performed by a transmission module the same as or similar to transmission module 26 (shown in FIG. 1 and described above).

At an operation 64, responses of the users in the first segment to the recommendations in the one or more sets of recommendations may be tracked. In some implementations, operation 64 may be performed by a tracking module the same as or similar to tracking module 30 (shown in FIG. 1 and described above).

At an operation 66, the effectiveness of the recommendations in the one or more sets of recommendations for the first segment may be determined. This may include determining the relative effectiveness for the first segment of the first recommendation, the second recommendation, and/or other recommendations in the one or more sets of recommendations. In some implementations, operation 66 may be performed by an analysis module the same as or similar to analysis module 32 (shown in FIG. 1 and described above).

For example, analysis module 32 may be configured to assess the relative effectiveness of a given recommendation as a function of a number of users that perform a recommended action included in the given recommendation. Analysis module 32 may also be configured to assess the relative effectiveness of a given recommendation as a function of retention of users that perform a recommended action included in the given recommendation versus users that do not perform the recommended action. Retention of users may be quantified, for example, as an average retention time of users that perform the recommended activity, as a number of users that are retained for a threshold amount of time, a number of users that spend a threshold amount of money in the game, an average revenue per user, and/or other quantifiers. Analysis module 32 may also be configured to assess the relative effectiveness of a given recommendation as a function of an average amount of participation by users in the game within a given amount of time after transmission of the recommendation. In another example, analysis module 32 may also be configured to assess the relative effectiveness of a given recommendation as a function of an average amount of time from the transmission of the recommendation to participation by users in the game.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to provide different recommendations to users of a virtual space and assess relative effectiveness of the provided recommendations, wherein the recommendations are intended to prevent the users from being unsatisfied or discouraged with their situations in the virtual space, and wherein effectiveness is a function of retention of the users that perform actions in accordance with the provided recommendations, the system comprising:

one or more processors configured by machine-readable instructions to:
execute an instance of a virtual space, and to implement the instance of the virtual space to facilitate participation by one or more users in a game within the space by:
(i) determining view information from the instance and transmitting the view information to one or more client computing platforms associated with the one or more users that facilitate presentation of views of the virtual space to the one or more users by the one or more client computing platforms, and
(ii) receiving control inputs entered by the one or more users through the one or more client computing platforms, wherein the control inputs facilitate interaction between the one or more users and the virtual space;
obtain respective values of user parameters for the one or more users;
form one or more segments of the one or more users based on a value of the one or more respective user parameters, wherein the one or more segments include a first segment of users;
generate automatically, by the one or more processors, one or more sets of alternative recommendations for respective one or more segments of the one or more users, wherein a recommendation prompts a user to take a recommended action in the game, wherein a first set of alternative recommendations is generated for the first segment of users that includes a first recommendation recommending a first recommended action and a second recommendation recommending a second recommended action that is different from the first recommended action;
transmit the first and second recommendations to different users in the first segment of users;
track responses of the users of the first segment to the first and second recommendations such that, responsive to transmission of the first recommendation to a first subset of users in the first segment and to the transmission of the second recommendation to a second subset of users in the first segment, responses of the first subset of users to the first recommendation and responses of the second subset of users to the second recommendation are tracked by:
(i) determining whether individual users in the first subset of users have entered particular control inputs through the one or more client computing platforms to effectuate performance of the first recommended action,
(ii) determining whether individual users in the second subset of users have entered particular control inputs through the one or more client computing platforms to effectuate performance of the second recommended action,
(iii) determining a first metric of effectiveness for the first recommendation based on retention of those users in the first subset of users who effectuated performance of the first recommended action, and
(iv) determining a second metric of effectiveness for the second recommendation based on retention of those users in the second subset of users who effectuated performance of the second recommended action; and
generate a new recommendation for one or more subsets of an individual segment of the one or more users based on one or more of the first recommendation, the second recommendation, the first metric of effectiveness, the second metric of effectiveness, and the tracked responses of the users of the first segment; and
transmit the new recommendation to the appropriate users.

2. The system of claim 1, wherein the one or more processors are configured by machine-readable instructions to form the one or more segments of the users based on one or more of a demographic parameter, a social parameter, a game parameter, or an activity parameter.

3. The system of claim 2, wherein the one or more processors are configured by machine-readable instructions to form the one or more segments of the users based on a demographic parameter, and wherein the demographic parameter includes one or more of age, sex, geographic location, language, income, education, career, or marital status.

4. The system of claim 2, wherein the one or more processors are configured by machine-readable instructions to form the one or more segments of the users based on at least a social parameter, and wherein the social parameter includes one or more of a parameter derived from a social graph in a social network service, an in-game relationship, or a platform from which the virtual space is accessed.

5. The system of claim 2, wherein the one or more processors are configured by machine-readable instructions to form the one or more segments of the users based on at least a game parameter, and wherein the game parameter includes one or more of an entity class, an entity faction, a usage amount, one or more usage times, a level, inventory in the virtual space, or a score.

6. The system of claim 2, wherein the one or more processors are configured by machine-readable instructions to form the one or more segments of the users based on at least an activity parameter, and wherein the activity parameter includes a parameter determined from an action history of the user in the virtual space.

7. The system of claim 1, wherein the one or more processors are configured by machine-readable instructions to determine a relative effectiveness of a given recommendation as a function of a number of users that perform a recommended action included in the given recommendation.

8. The system of claim 1, wherein the one or more processors are configured by machine-readable instructions to determine a relative effectiveness of a given recommendation as a function of retention of users that perform a recommended action included in the given recommendation versus users that do not perform the recommended action included in the given recommendation.

9. The system of claim 1, where the one or more processors are configured by machine-readable instructions to determine a relative effectiveness of the first recommendation with respect to the second recommendation by comparing the first metric of effectiveness and the second metric of effectiveness.

10. The system of claim 9, wherein the first metric of effectiveness is quantified as one or more of an average retention time of users in the first subset of users, an average retention time of users in the first subset that perform the first recommended action, a number of users in the first subset that are retained for a threshold amount of time, a number of users in the first subset that spend a threshold amount of money on the game, or an average revenue per user in the first subset.

11. The system of claim 1, wherein the one or more processors are configured by machine-readable instructions to determine a relative effectiveness of the first recommendation with respect to the second recommendation as a function of an average amount of participation by the first subset of users in the game within the virtual space within a given time after transmission of the first recommendation relative to an average amount of participation by the second subset of users in the game within the virtual space within the given time after transmission of the second recommendation.

12. The system of claim 1, wherein the one or more processors are configured by machine-readable instructions to determine a relative effectiveness of the first recommendation with respect to the second recommendation as a function of an average amount of time from the transmission of the first recommendation to the first subset to participation by the first subset of users in the game within the virtual space relative to an average amount of time from the transmission of the second recommendation to the second subset to participation by the second subset of users.

13. A computer-implemented method of providing different recommendations to users of a virtual space and assess relative effectiveness of the provided recommendations, wherein the recommendations are intended to prevent the users from being unsatisfied or discouraged with their situations in the virtual space, and wherein effectiveness is a function of retention of the users that perform actions in accordance with the provided recommendations, the method being implemented in a computer system comprising one or more physical processors, the method comprising:
  executing an instance of a virtual space;
  implementing the instance of the virtual space to facilitate participation by the one or more users in a game within the space by:
    (i) determining view information from the instance and transmitting the view information to one or more client computing platforms associated with the one or more users that facilitate presentation of views of the virtual space to the one or more users by the one or more client computing platforms, and
    (ii) receiving control inputs entered by the one or more users through the one or more client computing platforms, wherein the control inputs facilitate interaction between the one or more users and the virtual space;
  obtaining values of respective user parameters for the one or more users, the respective user parameters comprising a first parameter;
  forming a first segment of users from the one or more users based on a value of the first parameter;
  generating automatically, by the one or more physical processors, a first set of alternative recommendations for the first segment of users, wherein a recommendation prompts a user to take a recommended action in the game, the first set of recommendations including at least a first recommendation and a second recommendation, and wherein the first recommendation recommends a first recommended action and the second recommendation recommends a second recommended action that is different from the first recommended action;
  transmitting the first and second recommendations to different users in the first segment of users;
  tracking responses of the users of the first segment to the first and second recommendations, the tracking including, responsive to the transmission of the first recommendation to a first subset of users of the first segment and the transmission of the second recommendation to a second subset of users of the first segment, tracking the responses of the first subset to the first recommendation and tracking the responses of the second subset of users to the second recommendation by:
    (i) determining whether individual users in the first subset of users have entered particular control inputs through the one or more client computing platforms to effectuate performance of the first recommended action,
    (ii) determining whether individual users in the second subset of users have entered particular control inputs through the one or more client computing platforms to effectuate performance of the second recommended action,
    (iii) determining a first metric of effectiveness for the first recommendation based on retention of those users in the first subset of users who effectuated performance of the first recommended action, and
    (iv) determining a second metric of effectiveness for the second recommendation based on retention of those users in the second subset of users who effectuated performance of the second recommended action;
  generating a new recommendation for one or more subsets of an individual segment of the one or more users based on one or more of the first recommendation, the second recommendation, the first metric of effectiveness, the second metric of effectiveness, and the tracked responses of the users of the first segment; and
  transmitting the new recommendation to the appropriate users.

14. The method of claim 13, wherein the first parameter includes one or more of a demographic parameter, a social parameter, a game parameter, or an activity parameter.

15. The method of claim 14, wherein the first parameter includes at least a demographic parameter, and wherein the demographic parameter includes one or more of age, sex, geographic location, language, income, education, career, or marital status.

16. The method of claim 14, wherein the first parameter includes at least a social parameter, and wherein the social parameter includes one or more of a parameter derived from a social graph in a social network service, an in-game relationship, or a platform from which the virtual space is accessed.

17. The method of claim 14, wherein the first parameter includes at least a game parameter, and wherein the game parameter includes one or more of an entity class, an entity faction, a usage amount, one or more usage times, a level, inventory in the virtual space, or a score.

18. The method of claim 14, wherein the first parameter includes at least an activity parameter, and wherein the activity parameter includes a parameter determined from an action history of the user in the virtual space.

19. The method of claim 13, further comprising determining a relative effectiveness of a given recommendation as a function of the number of users that perform a recommended action included in the given recommendation.

20. The method of claim 19, further comprising determining a relative effectiveness of a given recommendation as a function of retention of users that perform a recommended action included in the given recommendation versus users that do not perform the recommended action included in the given recommendation.

21. The method of claim 13, wherein the first metric of effectiveness is quantified as one or more of an average retention time of users in the first subset of users, an average retention time of users in the first subset that perform the first recommended action, a number of users in the first subset that are retained for a threshold amount of time, a number of users in the first subset that spend a threshold amount of money on the game, or an average revenue per users in the first subset.

22. The method of claim 13, further comprising determining a relative effectiveness of the first recommendation with respect to the second recommendation as a function of an average amount of participation by the first subset of users in the game within the virtual space within a given time after transmission of the first recommendation relative to an average amount of participation by the second subset of users in the game within the virtual space within the given time after transmission of the second recommendation.

23. The method of claim 13, further comprising determining a relative effectiveness of the first recommendation with respect to the second recommendation as a function of an average amount of time from the transmission of the first recommendation to the first subset of users to participation by the first subset of users in the game within the virtual space relative to an average amount of time from the transmission of the second recommendation to the second subset of users to participation by the second subset of users.

* * * * *